G. CARON.
CURVE DRAWING APPARATUS.
APPLICATION FILED FEB. 8, 1918.
1,285,616.
Patented Nov. 26, 1918.
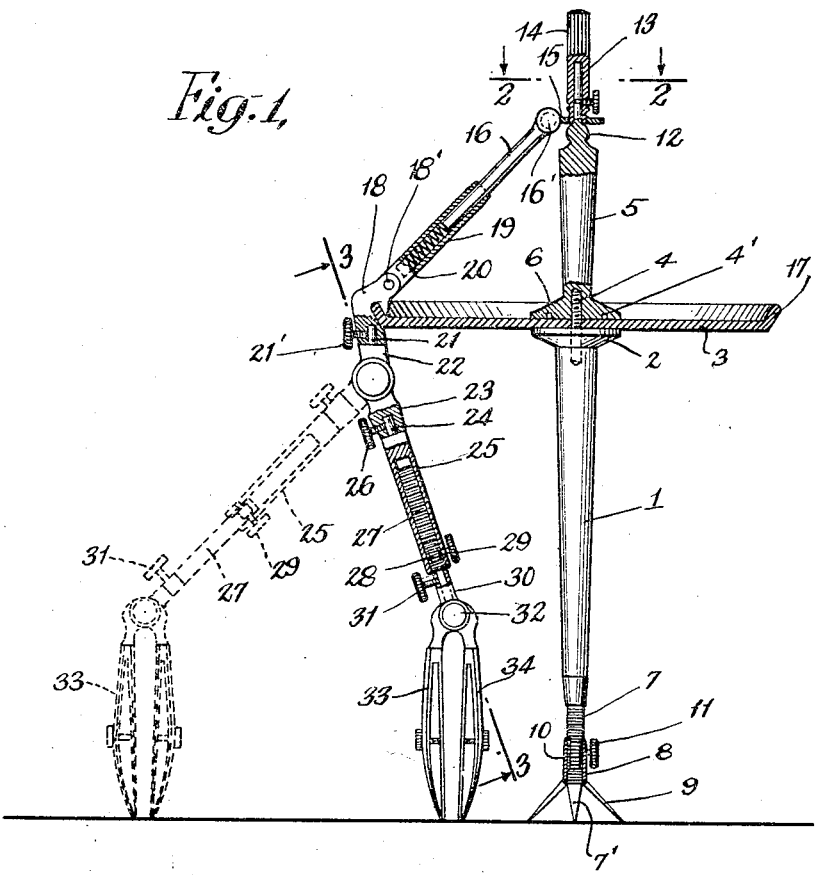
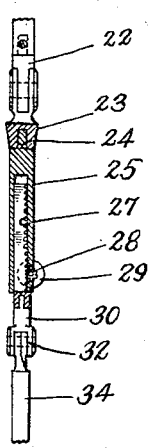
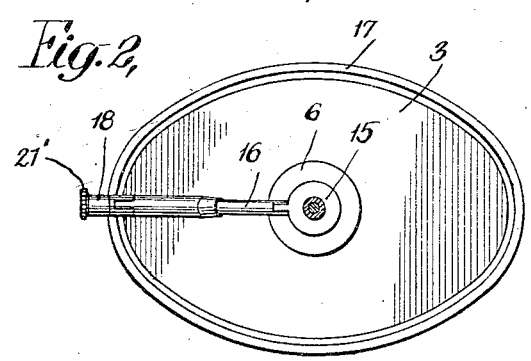
INVENTOR
George Caron
BY
ATTORNEY

UNITED STATES PATENT OFFICE.

GEORGE CARON, OF BROOKLYN, NEW YORK.

CURVE-DRAWING APPARATUS.

1,285,616.  Specification of Letters Patent.  Patented Nov. 26, 1918.

Application filed February 8, 1918. Serial No. 216,002.

*To all whom it may concern:*

Be it known that I, GEORGE CARON, a citizen of the United States, residing in the borough of Brooklyn, county of Kings, and State of New York, have invented certain new and useful Improvements in Curve-Drawing Apparatus, of which the following is a specification.

My invention relates to apparatus for accurately drawing ellipses or other desired curves of greater or less dimensions and my object is to provide devices of this character which shall be efficient, simple and easily manipulated. In carrying out my invention I provide a central spindle or support which preferably is provided with a firm tripod base and which preferably may be adjusted in length. A templet having a periphery of the desired oval or other shape is secured to the spindle and forms a guiding means for a member which is caused to travel around the periphery of the templet in firm contact therewith during the operation of the device. This member is connected to the operating handle by a pivoted sliding connection such as a sleeve and plunger connection, preferably having an interposed spring, so that the member may constantly be held in contact with its track, which preferably is formed by turning upwardly the edge of the templet. The drawing instrument, either a pen or a pencil, is connected to the member which travels around the templet by pivoted connections in which provision is made for longitudinal adjustment so that curves of greater or less dimensions may be drawn. Preferably provision is made so that a pair of markers may be carried by the connections if desired to draw parallel spaced curves at the same time.

In order that a clearer understanding of my invention may be had attention is hereby called to the accompanying drawings forming part of this application and illustrating the preferred embodiment of my invention; in the drawings Figure 1 represents a front elevation of my device certain parts being shown in section, and the markers and connecting arm being shown in dotted lines in a second position, Fig. 2 represents a horizontal section taken on line 2—2 of Fig. 1 and Fig. 3 is a section taken on line 3—3 of Fig. 1.

Referring to the drawings the central support comprises a vertical spindle 1 having an enlargement 2 at its upper end. A curved templet 3 rests on the plane upper surface of the enlargement 2 and is firmly secured thereto. Preferably the enlargement 2 is provided at its central point with an upwardly extending screw 4 which is adapted to be passed through a central opening in templet 3, and screwed into a screw-threaded opening in the enlargement 6 at the lower end of the upper spindle member 5, so that the templet is firmly clamped between the enlarged portions 2 and 6 of members 1 and 5. Dowel pins 4' may also be used extending into the templet from enlargement 2 or 6. The vertical support preferably has an adjustable base as shown in the drawings in which spindle 1 is provided at its lower end with an extension 7 having rack-teeth thereon and terminating in a sharp pointed portion 7'. Member 7 passes through a sleeve 8 provided at its lower end with a plurality, such as three of downwardly and outwardly slanting supporting members 9 having pointed lower ends to form a tripod base adapted to firmly support the device in vertical position upon the drawing board. Sleeve 8 carries a small pinion 10 which engages with the rack-teeth on extension 7 and is operable by a small knob or handle 11. In operation, point 7' is first placed at the desired center, with points 9 out of contact with the paper. Knob 11 is then turned to bring sleeve 8 down, to cause the three steel points 9 to press into the paper, and form a firm, level support for the device.

The extension 5 of the spindle is provided at its upper portion with a suitable bearing surface such as the ball 12 from which extends upwardly a cylindrical portion 13 of reduced diameter. The handle member 14 comprises a vertical shaft having a vertical socket extending upwardly from its lower end in which member 13 is rotatably mounted. Integral with or secured to the lower end of member 14 is a disk 15 having a central opening through which member 13 passes, this disk having a firm rotative bearing on the ball 12. A cylindrical arm 16 is hinged to disk 15 as shown at 16'. Member 14 may be provided with suitable means for gripping and rotating the same by the fingers of the operator, such as a knurled surface as shown.

The templet 3 has its outer edge accurately formed to the desired curvature such as an oval, the outer edge being turned up, as shown at 17, to form a track. The member 18 comprises a body-portion having an inclined slot therein adapted to slidably engage the up-turned edge 17 of the templet. Member 18 has hinged thereto, as shown at 18' an upwardly and inwardly slanting extension in the form of a sleeve 19 within which the lower end of arm 16 slidably engages. A coiled spring 20 is preferably mounted within sleeve 19 between the lower end of arm 16 and the bottom of the sleeve opening. The result of this construction is that as handle 14 is rotated member 18 will travel around track 17 in firm contact therewith, arm 16 moving in and out of sleeve 19 as the curvature of track 17 varies, spring 20 serving to always press member 18 firmly against the inner surface of track 17.

Member 18 is provided with a downwardly directed extension below the edge of the templet, provided at its lower end with an upwardly directed slot in which may be inserted the tongue 21 of a member 22 adapted to form a hinge for the marking instrument. A member 23 is hinged to member 22, in well known manner such as the tongue and groove construction illustrated, and is provided at its lower end with a slot in which the tongue 24 of member 25 may be secured by the adjusting screw 26. Tongue 21 may be similarly held in position by a screw 21'.

Member 25 is preferably provided with a central opening extending upwardly from its lower end in which is slidably mounted a member 27 having rack-teeth formed thereon. A small pinion 28 is mounted on a shaft supported in the walls of member 25 and engages the teeth of member 27 to raise or lower the same in the opening in member 25.

Member 27 is provided at its lower end with a slot in which is mounted the upwardly extending tongue of the member 30, the tongue being secured in position by an adjusting screw 31. Member 30 has pivotally secured thereto, as shown at 32, a suitable drawing instrument as for example the pen 33. Preferably a pair of similar marking instruments 33 and 34 are pivoted to member 30 at 32 by an appropriate tongue and groove pivotal connection, so that parallel curves may be drawn if desired.

The operation of the device will now become plain. The drawing instruments 33 and 34 are illustrated in Fig. 1 in full lines as adjusted to draw ovals of reduced dimensions in relation to the size of templet 3 and in dotted lines the instruments are shown adjusted to draw ovals of an enlarged size. The hand-wheel 29 must, of course, be turned to extend members 27 and 30 when a curve of greater dimensions is to be drawn. Both drawing instruments are used when parallel curves are to be drawn and one of the instruments may be swung up about its pivotal connection 32 when a single curve only is to be drawn. The construction is such that member 18 necessarily travels in accurate engagement with track 17 at all times. The apparatus may very readily be taken apart or set up as will be observed.

Having described my invention what I claim as new therein and desire to secure by Letters Patent of the United States is:

1. In a curve-drawing apparatus the combination of a vertical axial support, a curved templet carried thereby, a member adapted to travel around the periphery of said templet, and having an upwardly and inwardly extending projection, a drawing instrument secured to said member, a member rotatable about said support, having a portion slidably engaged with said projection, for relative movement lengthwise thereof, and adapted to drive said projection about said templet, and spring means between said members to constantly hold said first member in contact with the edge portion of said templet, substantially as set forth.

2. In a curve-drawing apparatus the combination of a vertical axial support, a horizontal templet carried thereby, having a curved track thereon, a member adapted to travel on said track, having an upwardly and inwardly inclined sleeve portion, a drawing instrument secured to said member, and a member rotatable about said vertical support, having an outwardly and downwardly inclined portion slidably engaged within said sleeve portion, substantially as set forth.

3. In a curve-drawing apparatus the combination of a vertical axial support having a pointed lower end, a horizontal templet carried thereby, having a curved track thereon, a member adapted to travel on said track, a drawing instrument, pivoted connections between said member and said instrument, a sleeve surrounding the lower portion of said axial support, carrying outwardly and downwardly extending supporting points, means for adjusting the position of said sleeve to cause said points to engage the surface on which the apparatus is mounted, and means for rotating said member about said track, and holding the same in firm contact therewith during rotation, substantially as set forth.

4. In a curve-drawing apparatus the combination of a vertical axial support, a horizontal templet carried thereby, having a curved track thereon, a member adapted to travel on said track, a drawing instrument, pivotal connections between said member and instrument, a manually-operable member, and pivoted and sliding connections between the same and said first member for rotating said first member about said track, and holding the same in firm contact therewith during rotation, substantially as set forth.

5. In a curve-drawing apparatus the combination of a vertical axial support, a horizontal templet carried thereby, having a curved track thereon, a member adapted to travel on said track, a pair of drawing instruments, adapted to draw parallel curves, connections between said member and instruments, having pivotal connections with said member, and with said instruments, adjustment means for permitting said instruments to be engaged with the sheet to be drawn upon, in various positions, and means for rotating said member about said track, substantially as set forth.

6. In a curve-drawing apparatus the combination of a vertical axial support, a horizontal templet carried thereby, having a curved upwardly extending track thereon, a member engaging said track, having an upwardly extending sleeve portion hinged thereto, a drawing instrument secured to said member, a manually-operable member mounted to rotate about said support, above said templet, having a downwardly extending plunger hingedly connected therewith, slidably engaged within the sleeve-portion of said first member, and a spring within said sleeve-portion engaging said plunger and acting on said first member, to hold said first member at all times firmly engaged with its track, substantially as set forth.

7. In a curve-drawing apparatus the combination of a vertical axial support having an enlarged bearing surface on its upper end, a horizontal templet secured thereon, having a curved track thereon, a second support secured on said templet in alinement with the first support, having a bearing surface, and a cylindrical extension above the same, a manually-operable vertical member rotatably mounted on said extension, having a horizontal portion at its lower end mounted on said last-named bearing surface, a member adapted to travel on said track, a drawing instrument secured thereto, and telescoping connections between said traveling member and said horizontal portion of the manually-operable member, substantially as set forth.

This specification signed and witnessed this 18th day of January, 1918.

GEORGE CARON.

Witnesses:
DYER SMITH,
I. McINTOSH.

Copies of this patent may be obtained for five cents each, by addressing the "Commissioner of Patents, Washington, D. C."